July 24, 1923.
K. G. HANHART
VESSEL
Filed March 24, 1920
1,462,543
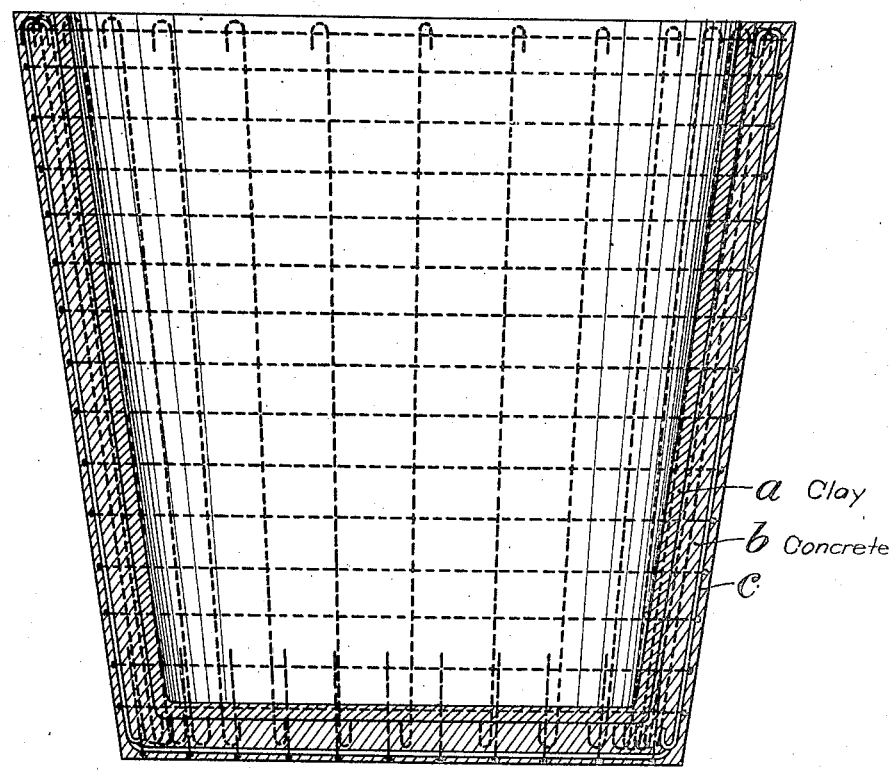

Patented July 24, 1923.

1,462,543

UNITED STATES PATENT OFFICE.

KARL GUSTAV HANHART, OF RUSCHLIKON, SWITZERLAND, ASSIGNOR TO FARBEREI WEIDMANN A.-G., OF THALWIL, SWITZERLAND.

VESSEL.

Application filed March 24, 1920. Serial No. 368,432.

*To all whom it may concern:*

Be it known that I, KARL GUSTAV HANHART, a citizen of Switzerland, residing at Alte Landstrasse 288, Ruschlikon, in the Canton of Zurich and Republic of Switzerland, have invented certain new and useful Improvements in Vessels, of which the following is a specification.

It is well known that it is dangerous to boil in great clay-vessels because stresses arise in consequence of inequal dilatation, such stresses being the cause of bursting of the hollow body.

The object of the present invention is to render harmless such tensions.

In the accompanying drawing an example of the vessel made according to the present invention is shown in a vertical section.

The vessel shown is formed by an inner layer $a$ of clay and an outer layer $b$ made of armoured concrete, which, when the vessel is heated from the interior, increases the resistance against bursting of the clay layer. The crosswise laid reinforcement $c$, extending over the wall and the bottom of the vessel is laid into the outmost zone of tensile stresses of the layer $b$ which is preferably of the same thickness throughout. In this zone a less dilatation occurs than on the inner side owing to the less heating, so that detrimental tensile stresses in the hollow body are avoided. In consequence of the good adherence of the cement or concrete onto the clay-layer the reinforced layer forms a preferred preservative against mechanical damaging of the clay-layer.

The form of the vessel may be another one than that in the represented example. Also the reinforcement may be constructed otherwise than as shown.

The receptacle is used in the chemical industry, for instance as a receptacle for chemical reactions in which the content of the receptacle is heated by the reaction itself or by steam fed into the same. The receptacle may be used for dissolving metals in acids, in oxidizing processes, etc.

What I claim is:—

A large tank adapted to be highly heated from the interior and used in the chemical industry including a prepared inner vessel of calcined clay and an outer strong shell formed of reinforced concrete.

In testimony whereof I have affixed my signature.

KARL GUSTAV HANHART.